Patented Nov. 4, 1930

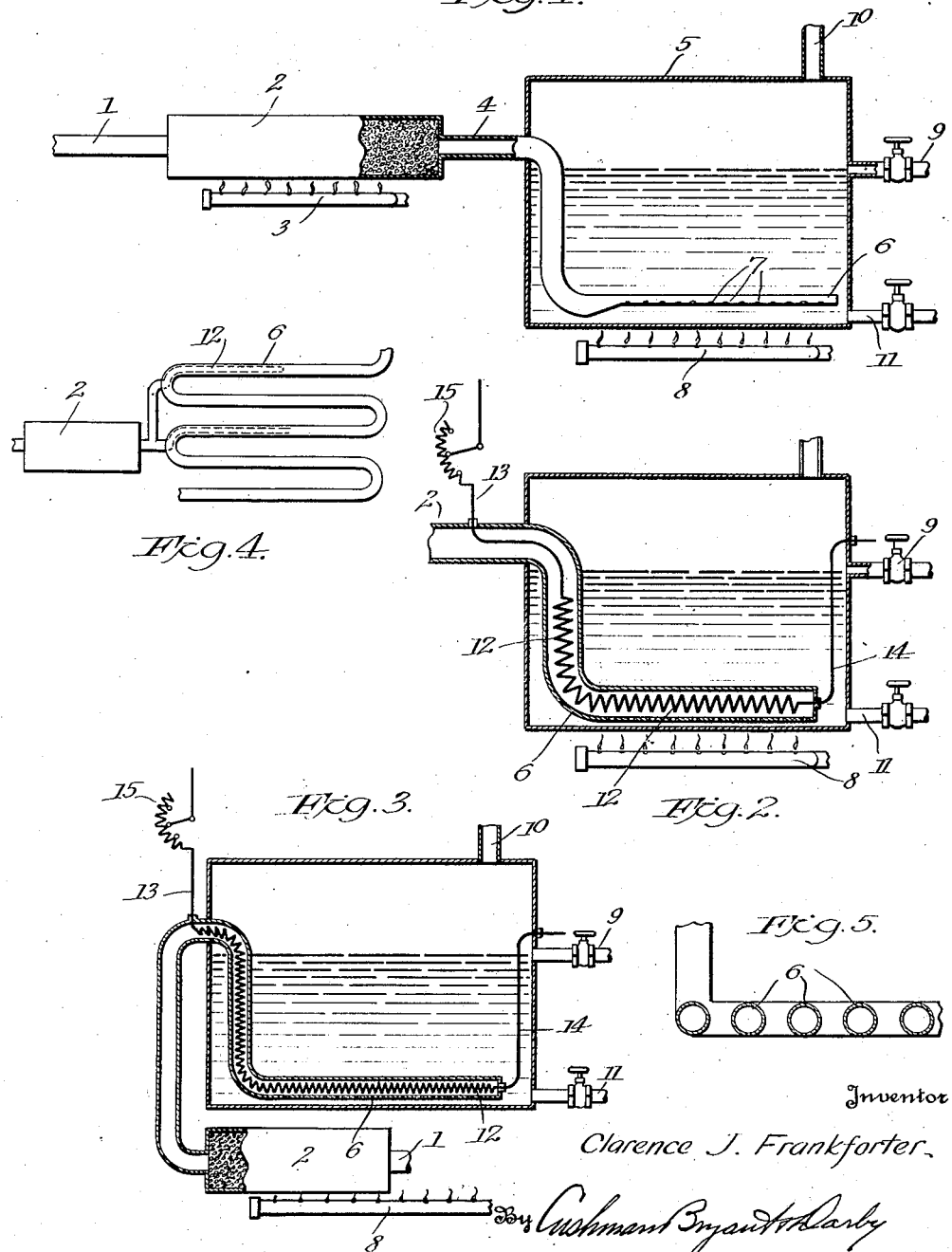

1,780,873

UNITED STATES PATENT OFFICE

CLARENCE J. FRANKFORTER, OF LINCOLN, NEBRASKA, ASSIGNOR TO FRANKFORTER OIL PROCESS, INC., OF OMAHA, NEBRASKA, A CORPORATION OF NEBRASKA

PROCESS OF TREATING HYDROCARBONS

Application filed August 27, 1929. Serial No. 388,646.

REISSUED

This invention relates to improvements in process and apparatus for treating mineral oils and heavy portions thereof, as well as lighter distillates and fractions, also hydrocarbons from shales and other sources.

The invention has for its object to facilitate the usual distillation or cracking of crudes and distillates and to do so in a manner which will increase the speed of the treatment, and result in an increased yield of the various lighter products, such as gasoline and kerosene, as well as the lubricating and gas oil fractions.

It is an object of the invention to carry out the process while the material under treatment is undergoing usual distillation or cracking, and the results obtained are satisfactory with but a single distillation of the crude product or distillate.

The invention proceeds upon the principle that the hydrocarbon undergoing distillation or cracking in the still, is simultaneously subjected to the action of an activated gas containing hydrogen.

The activation of the hydrogen or hydrogen containing gas is brought about by heating the gas in intimate contact with a catalyst before its introduction into the oil. For example, hydrogen gas or a gas containing hydrogen when subjected to the action of a high resistance electric heating element will be activated to such a degree that the volatilization of the lighter fractions of the crude or distillate will be rapid and complete. The high resistance wire acts as a catalyst and the hydrogen so activated has the function of rapidly combining with the sulfur and sulfur compounds present in the oil to form hydrogen sulfide gas, and also the effect of reducing or transforming the more complicated sulfur compounds into a simpler non-corrosive form, whereby they will not attack the apparatus.

Moreover, the hydrogen gas or hydrogen containing gas is passed in intimate contact with a catalyst and heated whereby the gas is activated. It will then upon introduction to the oil contained in the still, act to facilitate cracking and substantially eliminate and reduce the effect of sulfur, as described.

The electrical catalytic treatment, and the treatment with catalytic coated igneous material may be combined to activate and prepare the gas with the same remarkable result, and both processes may be utilized for a definite period, and then either of them may be selectively employed according to condition, such as nature of the oil, apparatus employed, and the products which it is desired to obtain.

In the drawings:

Figure 1 is a diagrammatic view.
Figure 2 is a similar view.
Figure 3 is a view with the steps of Figures 1 and 2 combined.
Figure 4 is a view similar to Figures 1, 2 and 3 with a pipe still.
Figure 5 is a detail view.

Referring to Figure 1, the numeral 1 indicates a conduit of any suitable size and nature, to which is passed hydrogen or a gas containing hydrogen, such as commercial water gas, and in fact any hydrogen containing gas having a sufficient proportion of hydrogen. Communicating with the conduit is an enlarged tube or chamber 2. Within this chamber, there is disposed a finely granulated igneous material of cellular structure of the general nature of pumice, which has been coated or impregnated, or which has been suitably mixed with a catalyst, such as platinum. The granular material may vary from relatively fine powder to particles of an inch or more in order that the largest possible platinum surface may be exposed. Arranged below the tube 2 is a heating means 3 which may be a gas burner, electric heating coils, or any other suitable apparatus. Communicating with the chamber 2 at the other end is a conduit 4. This conduit 4 extends into the usual still or retort 5, such as is commonly employed for the distilling or cracking of mineral oils and distillates.

The conduit 4, as shown, enters the still above the oil level, indicated by dot and dash lines, and passes downwardly and terminates in a tube 6. This tube 6 may be integral with the conduit, or may be a detachable member secured to the downwardly extending leg. On its underside, the tube 6 is provided with a plurality of openings, slits or perforations 7.

Disposed below the still 5 is a suitable furnace or other heating means 8, such as is usually associated with such apparatus. An inlet 9 for material to be treated, and an outlet 10 for the volatile products, as well as a draw-off outlet 11, are provided in the still which, as stated, may be of any usual and accepted design.

In practicing the process, the gas under a suitable pressure is delivered to the conduit 1 and passes into the tube 2, where in the presence of heat from the burners 3, it comes in intimate contact with the catalytic agent situated in the said chamber 2. I have found that the hydrogen or the hydrogen containing gas so treated becomes activated in a most remarkable manner, and when this gas is permitted to pass through the conduit 4 to the tube 6, it will exert a very beneficial effect upon the distilling or cracking process which the oil is undergoing, to the end that a greater yield of lighter fractions is obtained, and the effect of the sulfur content is minimized.

There will be a tendency for the oil to reach its level in the conduit, and since the incoming gas will be under pressure, the oil will be depressed. It will, of course, bubble up as the gas bubbles down through the tube out through the oil by means of the openings 7 in the tube 6, and up through the main body of the oil. This gas bubbling through the oil keeps it well stirred, and also brings fresh oil in contact with the incoming gas. I find that by introducing the activated hydrogen gas after its catalytic treatment and in heated condition to the oil, that the various fractions separate or come off quickly and completely, and that the greater part of the dissolved and chemically combined sulfur contained in the oil is changed to hydrogen sulfide, while certain other sulfur compounds are transformed into compounds which may be easily removed by economical present day methods.

It will be understood that the treatment with activated hydrogen, just described, is conducted simultaneously with the distillation or cracking process and the heated oil subjected to the chemical action of the hydrogen as well as to its heat component is caused to rapidly volatilize, with the result that the lighter fractions and distillates are speedily taken off.

The activated hydrogen, moreover, combines with the corrosive sulfur and sulfur compounds to render them non-corrosive. For instance, most of the sulfur reacts with the hydrogen and passes off as hydrogen sulfide gas which can be easily trapped and removed from any or all of the fractions by washing or treatment with caustic soda.

The effect of the hydrogen is, moreover, to react and combine with various sulfur compounds contained in the oil to change their chemical form and destroy their well known corrosive characteristics. This is particularly true with respect to the fractions and residue remaining after the lighter fractions and sulfur gases have been taken off.

The lighter fractions during the treatment are taken off through the outlet 10 and suitably condensed in the usual manner.

In referring to the use of an igneous material, it will be understood that any material which has the property of readily acquiring and retaining high temperatures can be employed, and while pumice has been specifically mentioned, any other suitable material may be impregnated, coated or mixed with a catalyst. Platinum has been specifically referred to as the catalyst, but there are, of course, numerous other catalytic substances which will be equally effective.

In the treatment just described, the hydrogen is activated exteriorly of the still and supplied thereto in heated condition. The temperature to which the hydrogen is subjected in contact with the catalyst may be varied in accordance with the oil under treatment, and the products to be obtained, and likewise its temperature when introduced into the oil may vary within wide limits. It is essential, however, that the temperature to be such as to facilitate distillation or breaking off of the lighter fractions, and at the same time permit the hydrogen to attack and combine with the sulfur and sulfur compounds to produce sulfur gases, such as hydrogen sulfide and simpler non-corrosive compounds.

I have also found that if the hydrogen gas is subjected to treatment in the presence of an electric heating element, that this element will exert a catalytic action, and to an even more remarkable degree, activate the hydrogen to obtain the desired results.

Referring to Figure 2, I employ a still similar to that previously described. A conduit 2 receives the gas or hydrogen containing gas and enters the still above the oil level therein, as previously described, and extends downwardly and is either integral with or has attached to it a tube similar to the tube 6 previously referred to.

In Figure 2, the tube 6 is preferably formed of electrically non-conductive material, although as with the tube shown in Figure 1, it is heat conductive.

The tube 6 may be formed of iron, steel, or other metal or alloy suitably coated with an electrically non-conducting material, such as glass, porcelain or other similar material.

The tube 6 in Figure 2 and the leg of the conduit with which it communicates, are provided with an electric resistance element indicated at 12. It will be observed that the resistance element extends above the level of the oil at the inlet side of the gas conduit, and suitably insulated leads connect at opposite ends to the resistance element, said leads being numbered 13 and 14.

The tube 6, as shown in Figure 2, is provided with similar openings, slits or perforations to those indicated in Figure 1, and the end of the tube is closed, except insofar as is necessary to permit connection from the lead 14 with the resistance element. The resistance coil is of spiral coil formation for the major portion of its length, as shown, and extends within the conduit, as well as the tube 6. It may extend throughout the entire length of the conduit or tube, or may be of the length substantially as shown. It is desirable to allow for sufficient contact of the gas and wire to activate the gas before it contacts with the oil.

The hydrogen gas passing through the conduit comes in contact with the heated resistance element, which is preferably of nickel chromium wire, and a catalytic action takes place whereby the hydrogen is activated to a very remarkable degree, and exerts even more completely its effect of speeding the complete breaking up of the lighter fractions, as well as combining with the sulfur and sulfur compounds to eliminate their corrosive character.

It will be understood that the hydrogen or hydrogen containing gas first comes in contact with the hot wire alone, and then is introduced into the oil while both are subjected to the action of the high resistance element, it being understood that the oil will enter the tube through the openings and tend to rise in the conduit up to its level.

Upon referring to the drawings, it will be seen that the tubes 6 are immersed in the oil and are disposed a sufficient distance above the bottom of the still to permit the gas to bubble out through the openings in the tubes, and also permit oil to enter the tubes and conduit to its level.

Where the electric catalytic wire is employed, there will likewise be a tendency for the oil to reach its level in the conduit. With the gas coming in, the liquid will be depressed and will, of course, bubble up as the gas bubbles down through the tube and out though the oil by means of the openings in the tube, and up through the main body of the oil. This gas bubbling through the oil keeps it well stirred and brings fresh oil into contact with the wire.

While I have illustrated diagrammatically but a single tube 6, it will be understood that any number of such tubes may be employed and connected to a suitable header for selectively supplying gas to any or all of such tubes, as for instance, shown in Figure 5.

Referring again to Figure 2, a suitable rheostat may be employed to regulate the temperature of the electric heating element, and while I have indicated the electric heating element as of high resistance material, such as nickel chromium, it will be understood that other compositions or types of electrical elements will be found satisfactory.

Referring to Figure 3, I have illustrated an apparatus wherein both catalytic treatments are employed. It may be desirable in some cases to utilize both steps while in others, either one may be more useful. Moreover, it may be desirable to initially utilize both and thereafter discontinue one or the other, or start with one and supplement with the other, or discontinue either one in favor of the other.

I have found that where the hydrogen is activated in the presence of the high resistance element, as shown in Figure 2, that for a given temperature the yield of lighter fractions and the speed of distillation is much greater than where the hydrogen is simply passed over the pumice impregnated with platinum and then introduced into the oil. In other words, the electrical treatment is by far the more effective, although both treatments rely upon catalytic phenomena for their success.

In Figure 3, it will be noted that the granular catalyst is heated from the same course as the still, which expedient may readily be employed in the interests of fuel economy. This, of course, is not essential but indicates that if found preferable it can be resorted to. Where the granular catalytic material is not disposed in the furnace or adjacent the burner, as shown in Figure 3, and it is desired to use the heat of the furnace gases, they may be piped to the chamber by a suitable cut off, so that the chamber and its contained material will be similarly heated. Again, it may be found desirable to have both means for catalytically treating the hydrogen associated with the still with separate conduits for conveying the hydrogen into the oil.

In Figure 5, I have illustrated the invention applied to the commonly identified type of pipe still. Either catalytic treatment or both may be employed in the manner heretofore described, and it is preferable that the gas be introduced at two or more points of the still. In other words, two or more tubes 6 are utilized and are positioned in the branches of the still, so that they are submerged in the oil.

It is understood that the treatment with activated hydrogen is carried on concomitantly with the usual distillation or cracking process.

By introducing the activated hydrogen in heated condition after contact with a catalyst, whether from the pumice treated with platinum or by subjecting the hydrogen to the catalytic action of the resistance element, I observe that the speed of distillation or cracking is increased, and the corrosive effect usually associated with sulfur contained in oils is eliminated.

The sulfur for the most part is combined with the hydrogen to produce hydrogen sulfide which passes off with the volatiles, and is trapped and eliminated as by a washing with caustic soda.

In addition to the hydrogen sulfide gas, the more complicated sulfur compounds are destroyed or transformed by the activated hydrogen into simpler sulfur compounds which can be economically extracted from any and all of the fractions.

In carrying out one test with the present invention, a crude and a heavy distillate each containing approximately two and one-half (2½) to three (3) per cent of sulfur were each treated, and it was found that substantially two-thirds (⅔) of the sulfur passed off and was eliminated as hydrogen sulfide gas.

In another test on a high sulfur crude, substantially three fourths (¾) of the total sulfur was eliminated as hydrogen sulfide.

Fixed gas is produced during the treatment which is slightly in excess of that produced in ordinary topping or skimming distillations, but not in great excess, and in fact below that produced by various cracking and distillation processes. The fixed gases should be compressed and refrigerated to recover any condensable hydrocarbons, such as go to make up a light or wild gasoline comparable to any natural gas gasoline or so-called casing head gasoline. The non-condensable gases are available for fuel, for oxidation with the production of alcohols, aldehydes, etc. as is being accomplished today, or for chlorination with the production of various hydrocarbon chlorine compounds which in turn are often hydrolyzed to yield various alcohols after a well known and accepted procedure.

It will be observed that where the electric or hot wire is employed, that a rheostat 15 is inserted in the circuit so as to regulate and control the temperature of the wire.

The temperature at which the hydrogen gas is introduced into the oil will, of course, vary, as stated, but will never be below that of the oil in the still.

The heat of the gas is naturally imparted to the oil to assist the cracking and distillation, and since the gas is activated, its chemical combining powers are greatly increased, so that its effect upon the sulfur and sulfur compounds is very rapid and at times immediate.

The gas can be continuously supplied to the oil and bubble through it or an intermittent bubbling can be accomplished, as desired, depending upon the oil under treatment and other conditions.

The present invention aims to increase the proportions of the lighter fractions which may be obtained from a crude oil or heavy portion thereof, and to eliminate sulfur and the corrosive effect of sulfur and sulfur compounds upon the apparatus which has always been a serious problem. The invention greatly increases the yield of gasoline, kerosene, of lubricating and gas oil distillates and other light fractions obtainable from crude oil or heavy fractions thereof, and in a single distillation.

The invention, as stated, eliminates in the form of hydrogen sulfide gas, a very large proportion of all forms of sulfur present in the hydrocarbon mixture under treatment, and changes the sulfur and sulfur compounds which may remain in the several fractions and residue of the oil to render them non-corrosive.

It will be understood that the tubes or conduits for conveying the activated gas may be various sizes, and as shown in Figure 5, there may be any number of perforated tubes connected to a suitable header. Such tubes may each contain an electric resistance element, or may simply follow the embodiment of Figure 1. In any case, each tube will be controlled by a valve so that the amount of gas which is bubbled in contact with the oil is selectively controlled.

The tubes and conduits, of course, may be of various sizes, depending upon the size of the operation, the nature of the oil, and other conditions.

The diameter of the resistance wire may vary within fairly wide limits. While I have employed a standard electric wire of nickle chrome, it will be understood that the factors controlling the size of the wire are mechanical strength, and the consumption of electrical energy necessary to maintain the proper temperature under a given set of conditions, as for instance, a particular type of oil and distill or chamber in which it is being treated.

As stated, one or more of the tubes 6 with or without the hot wire are located near the bottom of a still or retort, or other apparatus, and the size and capacity of the still will govern the number of tubes employed. The tubes are preferably placed a slight distance above the bottom of the still so that gas may bubble therefrom and oil may enter the tube and conduit.

Copper leads 13 and 14 carry the required electrical energy to the resistance wire through suitable insulating connections in the walls of the still or other vessel, or the walls of a tube in a tube still.

In Figure 2, it will be understood that the hot wire extends above the level of the oil and within the conduit, so that the gas is initially treated solely in the presence of the hot wire, and thereafter bubbles into the oil which has risen in the conduit, and is present in the tube 6, so that both the oil and the gas are simultaneously subjected to the catalytic action of the hot wire.

Since there are no perforations in the conduit above the oil level, all of the activated gas passes into and through the oil, whether the electric hot wire is used or if it is omitted. It will be understood that the tube 6 is preferably closed at its immersed end, and as stated in connection with Figure 2, only a sufficient opening is permitted to allow the electrical connections to be made.

In connection with the pipe still illustrated in Figure 4, it is well to introduce the activated hydrogen at more than one point in the cycle through the pipe still. The electrically non-conducting tube or tubes 6 carrying the resistance wires are located concentrically in one or more sections of the tubes or pipes of the still. The connections are inserted in the pipe still, preferably at points in the tubes or pipes where the oil has been thoroughly preheated. The action of the invention in connection with a still of this character is similar to that with a retort of the shell type, or any other intermittently or semi-continuously operating still.

The condensing apparatus for recovering and condensing the volatiles can be of any conventional design, as is well known.

It will be understood that the condensable, as well as the non-condensable volatiles will carry a considerable proportion of hydrogen sulfide gas formed by the chemical interaction of the activated gas upon the sulfur and sulfur compounds in the oil under treatment. By a suitable washing as with caustic soda, the hydrogen sulfide may be eliminated, and, of course, the gases may be passed through any solution with which hydrogen sulfide reacts so as to remove it and allow the residual gases to be collected and employed as desired.

The pressure required for propelling the activated hydrogen into the still and causing it to bubble through the oil will, in most instances, not be very great, but if necessary, forcing means of any conventional type may be employed to impart to the gas a sufficient pressure to cause it to be thoroughly introduced in contact with the oil.

It is to be understood that in treating the various hydrocarbon mixtures with the activated hydrogen obtained by the catalytic treatment described, that there results a chemical change of the actively corrosive sulfur and sulfur compounds into forms with no corrosive action upon the metal parts of the refinery equipment. This is true with respect to the various fractions distilled off, as well as residual portions remaining in the retort passing through a still tube or drawn from the bottom of condensing or bubble towers. It is this feature of the invention, together with the greatly increased yield of fractions and distillates obtained which renders the process herein set forth economical and highly adaptable to the commercial refining of hydrocarbons, whether they be heavy crudes and portions thereof or various fractions.

It will be understood that the process illustrated and described is carried out, unlike most cracking operations, in the absence of pressure. However, it is quite possible to use my process in cracking and distilling operations where a pressure component is employed. In either case, the cracking or distillation is accomplished by the presence of the high resistance catalytic element and the activated gas. I have found that when operating at ordinary distilling temperatures with the lighter fractions being driven off slowly, when the activated gas, in conjunction with the electric resistance member, is employed as shown in Figures 2 and 3, that without raising the furnace temperature, the various lighter fractions are much more rapidly driven off and a greatly increased yield of lighter fractions obtained. In other words, a test of a heavy crude treated in a retort by the ordinary methods at temperatures ranging from that of initial distillation up to 450° F. the lighter fractions were driven off very slowly. Upon, however, subjecting the same quantity of oil and of the same character to a similar treatment, but in the presence of the hydrogen gas and the electric catalytic member, the lighter fractions are driven off much more rapidly and in larger volume, although the temperature of the retort was not raised.

This was further proved by treating a quantity of oil in a retort without utilizing the process of this invention when it was found that the lighter fractions distilled off slowly and to a relatively small degree. The residue, however, when similarly treated in the presence of the hydrogen gas and the catalytic member displayed the remarkable effect of additional lighter fractions rapidly splitting off in large volume, although the temperature of the retort or still was not increased.

In other words, the activated gas catalytically treated and in the presence of the catalytic member shown in Figures 2 and 3 exerts a cracking function upon the oil.

Referring to Figures 2 and 3, the length of the wire and its diameter will be governed by the following conditions:—

1. The size and capacity of the still—of any type.
2. The temperature required for the oil under treatment and the products taken off. Obviously a wire sufficiently heavy for a temperature of 1500° F. would serve well at temperatures below this point, but a wire only sufficient for a temperature of 1000° F. would not serve well at temperatures much higher than 1000° F.
3. The electrical properties of the wire, its resistance, etc. which properties govern the current demands and resulting temperatures.

In connection with the granular material employed, and which is coated with a catalyst, it will be understood that the material should not be too fine, since too much real fine material will offer an objectionable resistance to the gas flow. It is desired that the portions of crushed pumice or other granular material shall be of varying size so that voids may not be present in excessive amount. At the same time the maximum amount of surface over which the catalyst is spread is desired.

Referring to the use of activated hydrogen produced either by contact with the pumice catalytically treated or the catalytic hot wire method, or a combination of the two, it will be understood that the hydrogen so treated may be used in continuous distillations in a pipe or tube still. Moreover, it may be used in a retort type of still which is being operated semi-continuously or by the batch method.

The time of treatment, that is, the length of time the activated gas is passing through the distilling hydrocarbon mixture, will be governed by the following factors:—

1. The chemical nature of the hydrocarbon types or series present in the crude oil or other hydrocarbon mixture being treated.

2. The physical nature of the crude oil or other hydrocarbon mixture, that is, the proportions of gasoline, kerosene, distillate, lubricating fractions, fuel oil, etc., naturally present in the stock being treated.

3. The products desired by the refinery operating the process. It may be advisable or desirable to treat for a relatively long period of time thus "cracking" and desulfurizing practically the entire charge in the retort. On the other hand, it may be advisable or desirable to make only a short treatment if only the lighter fractions of the stock in hand are desired.

In a tube or pipe still operating under a constant pressure and therefore constant throughout of stock, the time factor is not readily controlled. In this case the amount of hydrogen would be controlled by using one or more gas induction tubes. The temperature of the incoming activated gas would be controlled by varying the temperature of the "pumice" or "hot wire" or both. These variations in the amount and temperature of the incoming gas would, of course, vary the amount of "cracking" and desulfurizing.

4. The amount of sulfur and sulfur compounds present in the stock under treatment will govern the temperature to which the activated gas is heated. Likewise, the sulfur and sulfur compound content will govern the temperature of the pumice or substitute therefor, as well as the temperature of the hot wire. Likewise, the period of exposure of the oil to treatment with the activated gas will depend upon the quantity of sulfur and sulfur compounds present. If the content is large, a longer period of treatment will be required, and if the sulfur and sulfur compound content is low, a decreased period of treatment will be employed.

Generally speaking, the treatment would continue until a test of the evolved gases and vapors showed no more than a trace of hydrogen sulfide. In some instances, I have had a final, small amount of greasy, coke-like residue left behind when the process was run until practically all of the original charge of high sulfur West Texas crude oil was distilled over. It might be desirable in some cases to merely "top" a crude known to have a relatively small proportion of gasoline and a large proportion of residue of no value save for fuel.

The volume of gas required will, of course, be dependent upon several factors, namely:—

1. The chemical nature of the naturally occurring series or types of hydrocarbons in the oil stock under treatment.

2. The chemical nature of the sulfur and sulfur compounds in the stock being treated.

3. The proportion of hydrogen in the gas being activated.

4. The desire of the refinery as to sulfur tolerances in the products being prepared.

With respect to the ratio of gas used to oil, I have found that the amount of gas required is relatively small. A fair estimate would be approximately three hundred cubic feet of commercial water gas per barrel of high sulfur West Texas crude oil. Some oils will require only a small amount of gas, and others may require relatively large amounts. The fact that all gases coming from the stills may be used as fuel or chemically processed, prevents the use of a large amount of gas becoming an unduly large expense item in the operation of the process, even if the process did not possess other exceedingly valuable adjuncts.

The higher the temperature of the gas, up to quite high practical limits—(no limit theoretically)—the more rapid the sulfur elimination and distillation. At temperatures of 450–500° F. the action of the gas begins, at least on some crudes. At 900–1000° F. the action is rapid in every instance we have observed. At still higher temperature the action is yet more rapid. There is no question but that the higher temperatures of the "pumice" treated catalyst increases the gas reactivity. It does this not only by increasing the gas temperature, but, the hotter the catalyst, the greater the activation of the gas, up to the theoretical one hundred percent activation. The exact chemico-mechanism of gas activation is, of course, not entirely known. It is a question of molecular and atomic structural disturbances which in some way produces an unstable equilibrium. This unstable equilibrium is temporary and generally reversible and is known as the activated state.

The "hot wire" or electric catalytic element may range from a temperature as low as 750–800° F. to as high as 1500–1600° F. Action is slow at 900° F. and exceedingly rapid at 1500° F. It is possible to bring the wire up to a temperature of 1800° F., but such a temperature is, generally speaking, undesirable, since excessive "cracking" results. I have operated with the wire held quite steadily at 1500° F. with excellent results.

A phenomenon known as the "thermionic effect" is, I believe, responsible for the gas activation and for the "cracking" where the oil contacts with the wire. This action is additional to what might be termed a "pure" heat reaction or thermo-chemical decomposition. It is well known that atoms of some elements are somehow "disturbed" by ions liberated or "shot off" from hot metals. Generally, the metals must be heated at least to a visible red heat to produce much effect, and all metals do not appear to behave exactly alike under similar conditions. The electrical energy involved in heating the wire also plays some part in activating the gas.

In lieu of the granulated pumice stone which is coated, impregnated, or mixed with a catalyst, any porous, refractory, earthy material will be employed. Alumina or alundum or a high temperature resisting fire brick will serve. The porosity is necessary. This property allows the platinum or other metal to be distributed over a very large surface area. The greater the surface exposed to the gas, the greater the activation, other things being equal. Obviously, a substance must be used which does not react chemically with the catalyst, thereby destroying it.

Any catalyst may be used which has a high melting point with little or no affinity for oxygen, oxides of carbon or nitrogen or elementary nitrogen, which gases are found in commercial water gas. Gold, iridium and even silver will be employed instead of platinum where desired, and in fact I may use any of the so-called "noble" metals. Platinum and platinum-group metals are readily gotten into the proper well distributed thin porous film on the surface of the pumice or other material. Chromium can be used provided the difficulty of locating it on the pumice can be overcome economically. In spite of its cost, platinum is one of the best metals to use. The life of the catalyst in my process is not limited, hence there is no continued replacement of expensive material. Even if it did "wear out" which might conceivably happen after very long and strenuous use, simply chemical means will recover it without appreciable expense.

Any metallic wire having the desired catalytic effect will serve and which offers sufficient electrical resistance to heat up well with the passage of the current, and which will not oxidize readily or react chemically with the oil, the sulfur or sulfur compounds or the gas. Obviously, the wire must not melt at any but very high temperatures. Platinum or platinum-iridium wire would serve as would platinum-rhodium alloy. These wires would be smaller than those of Ni-chrome or chromel and would have less mechanical strength.

The wire employed I have found, as heretofore stated, acts as a catalyst, due to the thermionic effect described aided possibly to some extent by electrical disturbances. The treatment of the gas with the granular impregnated catalyst or the treatment of the gas with the energized catalyst, and the treatment of the gas and oil with the energized catalyst, will demonstrate that the fundamental results obtained are due to catalyses.

However, as heretofore stated, there is a thermionic effect responsible for the gas activation and for the cracking where the gas and the oil and gas contact with the energized catalytic element. Such thermionic effect is in addition to what might be termed a pure heat reaction or thermo-chemical decomposition.

With the method illustrated in Figure 1, there is less cracking than with the method illustrated in Figures 2 and 3. Apparently, the hot activated hydrogen or other gas employed does some cracking simply because it carries the heat directly against the large hydrocarbon molecules, and this heat is hot enough, that is, the temperature is sufficiently high to cause thermo-chemical decomposition, and this decomposition is cracking. It is at this point that the hydrogen reacts with or seizes the sulfur atoms.

The hot wire or catalytic energized electric element is an important factor in the cracking operation. The activated hydrogen coming along at the instant thermo-chemical decomposition takes place has an excellent chance for taking up sulfur which it proceeds to do.

This invention may be modified in various of its details without, however, departing from the scope of the appended claims.

What I claim is:

1. The process of treating liqiud hydrocarbon oils and distillates containing sulphur and sulphur compounds, while in heated condition, comprising chemically re-acting upon the sulphur and sulphur compounds with a gas containing hydrogen preliminarily activated by contact with a heated contact substance, by presenting the activated gas to the liquid and further activating the gas in contact with a heated contact substance in the presence of the liquid to cause intimate contact of the activated gas with the sulphur and the sulphur compounds to produce chemical union therewith and to change the major portion of said sulphur and sulphur compounds into volatile sulphides, and separating said sulphides.

2. The process of treating liquid hydrocarbon oils and distillates containing sulphur and sulphur compounds, while in heated condition and in a continuously flowing body, comprising chemically re-acting upon the sulphur and sulphur compounds with a gas containing hydrogen preliminarily activated by contact with a heated contact substance, by presenting the activated gas to the liquid and further activating the gas in contact with a heated contact substance in the presence of the liquid to cause intimate contact of the activated gas with the sulphur and the sulphur compounds to produce chemical union therewith and to change the major portion of said sulphur and sulphur compounds into volatile sulphides, and separating out said sulphides.

3. The process of treating liquid hydrocarbon oils and distillates containing sulphur and sulphur compounds, while in heated condition, comprising chemically acting upon the sulphur and sulphur compounds with a gas containing hydrogen which has been activated preliminarily by contact with an electrically heated contact substance, by presenting the activated gas to the liquid and further activating the gas by contact with an electrically heated contact surface in the presence of the liquid to cause intimate contact of the activated gas with the sulphur and the sulphur compounds to produce chemical union therewith and to change the major portion of said sulphur and sulphur compounds into volatile sulphides, and separating out said sulphides.

4. The process of treating liquid hydrocarbon oils and distillates containing sulphur and sulphur compounds, while in heated condition and in a continuously flowing body, comprising chemically acting upon the sulphur and sulphur compounds with a gas containing hydrogen which has been activated preliminarily by contact with an electrically heated contact substance, by presenting the activated gas to the liquid and further activating the gas by contact with an electrically heated contact surface in the presence of the liquid to cause intimate contact of the activated gas with the sulphur and the sulphur compounds to produce chemical union therewith and to change the major portion of said sulphur and sulphur compounds into volatile sulphides, and separating out said sulphides.

5. The process of treating liquid hydrocarbon oils and distillates containing sulphur and and sulphur compounds, while in heated condition, comprising chemically acting upon the sulphur and sulphur compounds in a confined portion of the oil constantly circulating to and from the body of the oil, with a gas containing hydrogen which is activated by contact with a heated contact substance located in the confined portion of the oil, to cause intimate contact of the activated gas with the sulphur and the sulphur compounds to produce chemical union therewith and to change the major portion of said sulphur and sulphur compounds into volatile sulphides, and separating out said sulphides.

6. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, with a gas containing hydrogen which is activated by contact with a heated contact substance located in the confined portion of the oil, to cause intimate contact of the activated gas with the sulphur and the sulphur compounds to produce chemical union therewith and to change the major portion of said sulphur and sulphur compounds into volatile sulphides, and separating out said sulphides.

7. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil with a gas containing hydrogen activated in the presence of the oil by a contact substance located in said confined portion, by presenting the gas initially to said portion to cause intimate contact of the activated gas with the sulphur and the sulphur compounds to produce chemical union therewith and to change the major portion of said sulphur and sulphur compounds into volatile sulphides, and separating out said sulphides.

8. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil with a gas containing hydrogen activated in the presence of the oil by a contact substance located in said confined portion, by presenting the gas initially to said portion to cause intimate contact of the activated gas with the sulphur and the sulphur compounds to produce chemical union therewith and to change the major portion of said sulphur and sulphur compounds into volatile sulphides, and separating out said sulphides.

9. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, and in the body of the oil, with a gas containing hydrogen activated by contact with a heated contact substance in the confined portion of the oil, by presenting the gas successively to said portion and the body liquid in intimate contact with the sulphur and sulphur compounds to produce chemical union therewith and to change the major portion of the sulphur and sulphur compounds into volatile sulphides, and separating out said sulphides.

10. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, and in the body of the oil, with a gas containing hydrogen activated by contact with a heated contact substance in the confined portion of the oil, by presenting the gas successively to said portion and the body liquid in intimate contact with the sulphur and sulphur compounds to produce chemical union therewith and to change the major portion of the sulphur and sulphur compounds into volatile sulphides, and separating out said sulphides.

11. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, with a gas containing hydrogen which is activated by contact with an electrically heated contact substance located in the confined portion of the oil, by presenting the gas so activated to said confined portion in intimate contact with the sulphur and sulphur compounds to produce chemical union therewith and to change the major portion of the sulphur and sulphur compounds into volatile sulphides, and separating out said sulphides.

12. The process of treating liquid hydrocarbon oils and distillates containing sulphur and sulphur compounds, while in heated condition and in a continuously flowing body, comprising chemically acting upon the sulphur and sulphur compounds in a confined portion of the oil circulating to and from the body of the oil, with a gas containing hydrogen which is activated by contact with an electrically heated contact substance located in the confined portion of the oil by presenting the gas so activated to said confined portion in intimate contact with the sulphur and sulphur compounds to produce chemical union therewith and to change the major portion of the sulphur and sulphur compounds into volatile sulphides, and separating out said sulphides.

13. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, and in the body of the oil, with a gas containing hydrogen which is activated by contact with an electrically heated contact substance located in the confined portion of the oil, by presenting the gas successively to said confined portion and the body liquid in intimate contact with the sulphur and sulphur compounds to produce chemical union therewith and to change the major portion of the sulphur and sulphur compounds into volatile sulphides, and separating out said sulphides.

14. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, and in the body of the oil, with a gas containing hydrogen which is activated by contact with an electrically heated contact substance located in the confined portion of the oil by presenting the gas successively to said confined portion and the body liquid in intimate contact with the sulphur and sulphur compounds to produce chemical union therewith and to change the major portion of the sulphur and sulphur compounds into volatile sulphides, and separating out said sulphides.

15. The process of treating liquid hydrocarbon oils and distillates containing sulphur and sulphur compounds, while in heated condition, comprising chemically re-acting upon the sulphur and sulphur compounds with a gas containing hydrogen preliminarily activated by contact with a heated contact substance, by presenting the activated gas to the liquid and further activating the gas in contact with a heated contact substance in the presence of the liquid to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

16. The process of treating liquid hydrocarbon oils and distillates containing sulphur and sulphur compounds, while in heated condition and in a continuously flowing body, comprising chemically re-acting upon the sulphur and sulphur compounds with a gas containing hydrogen preliminarily activated by contact with a heated contact substance, by presenting the activated gas to the liquid and further activating the gas in contact with a heated contact substance in the presence of the liquid to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

17. The process of treating liquid hydrocarbon oils and distillates containing sulphur and sulphur compounds, while in heated condition, comprising chemically acting upon the sulphur and sulphur compounds with a gas containing hydrogen which has been activated preliminarily by contact with an electrically heated contact substance, by presenting the activated gas to the liquid and further activating the gas by contact with an electrically heated contact surface in the presence of the liquid to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out the sulphides.

18. The process of treating liquid hydrocarbon oils and distillates containing sulphur and sulphur compounds, while in heated condition and in a continuously flowing body, comprising chemically acting upon the sulphur and sulphur compounds with a gas containing hydrogen which has been activated preliminarily by contact with an electrically heated contact substance, by presenting the activated gas to the liquid and further activating the gas by contact with an electrically heated contact surface in the presence of the liquid to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

19. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, with a gas containing hydrogen which is activated by contact with a heated contact substance located in the confined portion of the oil, to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

20. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, with a gas containing hydrogen which is activated by contact with a heated contact substance located in the confined portion of the oil, to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

21. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil with a gas containing hydrogen activated in the presence of the oil by a contact substance located in said confined portion, by presenting the gas initially to said portion to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

22. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil with a gas containing hydrogen activated in the presence of the oil by a contact substance located in said confined portion, by presenting the gas initially to said portion to cause intimate contact of the activated gas with the sulphur and the sulphur compounds to produce chemical union therewith and to change the major portion of said sulphur and sulphur compounds into volatile sulphides, and simultaneously producing pyrolysis of the oil, thereby obtaining more volatile hydrocarbons and separating out said sulphides.

23. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, and in the body of the oil, with a gas containing hydrogen activated by contact with a heated contact substance in the confined portion of the oil, by presenting the gas successively to said portion and the body liquid in intimate contact with the sulphur and sulphur compounds to produce chemical union therewith and to change the major portion of the sulphur and sulphur compounds into volatile sulphides, and simultaneously producing pyrolysis of the oil thereby obtaining more volatile hydrocarbons, and separating out the sulphides.

24. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, and in the body of the oil, with a gas containing hydrogen activated by contact with a heated contact substance in the confined portion of the oil, by presenting the gas successively to said portion and the body liquid in intimate contact with the sulphur and sulphur compounds to produce chemical union therewith and to change the major portion of the sulphur and sulphur compounds into volatile sulphides, and simultaneously producing pyrolysis of the oil thereby obtaining more volatile hydrocarbons, and separating out the sulphides.

25. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, with a gas containing hydrogen which is activated by contact with an electrically heated contact substance located in the confined portion of the oil, by presenting the gas so activated to said confined portion in intimate contact with the sulphur and sulphur compounds to produce chemical union therewith and to change the major portion of the sulphur and sulphur compounds into volatile sulphides, and simultaneously producing pyrolysis of the oil, thereby obtaining more volatile hydrocarbons and separating out said sulphides.

26. The process of treating liquid hydrocarbon oils and distillates containing sulphur and sulphur compounds, while in heated condition and in a continuously flowing body, comprising chemically acting upon the sulphur and sulphur compounds in a confined portion of the oil circulating to and from the body of the oil, with a gas containing hydrogen which is activated by contact with an electrically heated contact substance located in the confined portion of the oil by presenting the gas so activated to said confined portion in intimate contact with the sulphur and sulphur compounds to produce chemical union therewith and to change the major portion of the sulphur and sulphur compounds into volatile sulphides, and simultaneously producing pyrolysis of the oil, thereby obtaining more volatile hydrocarbons and separating out said sulphides.

27. The process of treating liquid hydrocarbon oils and distillates containing sulphur and sulphur compounds, while in heated condition, comprising chemically acting upon the sulphur and sulphur compounds in a confined portion of the oil constantly circulating to and from the body of the oil, and in the body of the oil, with a gas containing hydrogen which is activated by contact with an electrically heated contact substance located in the confined portion of the oil, by presenting the gas successively to said confined portion and the body liquid in intimate contact with the sulphur and sulphur compounds to produce chemical union therewith and to change the major portion of the sulphur and sulphur compounds into volatile sulphides, and simultaneously producing pyrolysis of the oil, thereby obtaining more volatile hydrocarbons and separating out said sulphides.

28. The process of treating liquid hydrocarbon oils and distillates containing sulphur and sulphur compounds, while in heated condition and in a continuously flowing body, comprising chemically acting upon the sulphur and sulphur compounds in a confined portion of the oil constantly circulating to and from the body of the oil, and in the body of the oil, with a gas containing hydrogen which is activated by contact with an electrically heated contact substance located in the confined portion of the oil by presenting the gas successively to said confined portion and the body liquid in intimate contact with the sulphur and sulphur compounds to produce chemical union therewith and to change the major portion of the sulphur and sulphur compounds into volatile sulphides, and simultaneously producing pyrolysis of the oil, thereby obtaining more volatile hydrocarbons and separating out said sulphides.

29. The process of treating liquid hydrocarbon oils and distillates containing sulphur and sulphur compounds, while in heated condition, which comprises conducting to the liquid and bubbling in intimate contact with the sulphur and sulphur compounds therein, a gas containing hydrogen, activating said gas by contact through a substantial portion of its path of travel with the exposed heated surface of a separately heated contact substance located in a conduit leading from a gas supply into the oil, to cause said activated gas to chemically re-act with the sulphur and sulphur compounds to produce chemical union therewith and change the major portion of said sulphur and sulphur compounds into volatile sulphides, and separating out said sulphides, said gas being presented to the liquid under a relatively low pressure adapted to effect said bubbling action.

In testimony whereof I have hereunto set my hand.

CLARENCE J. FRANKFORTER.